Jan. 12, 1971  C. R. DAWS  3,555,506

AUTOMOBILE AUTOMATIC TURN SWITCH REPOSITIONING

Filed Oct. 5, 1966  2 Sheets-Sheet 1

INVENTOR.
CHARLES R. DAWS

Jan. 12, 1971        C. R. DAWS        3,555,506

AUTOMOBILE AUTOMATIC TURN SWITCH REPOSITIONING

Filed Oct. 5, 1966        2 Sheets-Sheet 2

*INVENTOR.*
CHARLES R. DAWS

United States Patent Office 3,555,506
Patented Jan. 12, 1971

3,555,506
AUTOMOBILE AUTOMATIC TURN SWITCH REPOSITIONING
Charles R. Daws, 4422 Via Marina, Apt. 708, Marina Del Rey, Calif. 93933
Filed Oct. 5, 1966, Ser. No. 584,951
Int. Cl. B60q 1/00
U.S. Cl. 340—56
3 Claims

ABSTRACT OF THE DISCLOSURE

An automatic directional signal cancelling system for automatically returning to its neutral, nonindicating position, a master turn switch. As the result of predetermined vehicle behavior, a signal is generated which triggers a disconnect switch thus decoupling the master turn switch from its source of potential.

---

This invention relates to automobile lighting systems and particularly to an automatic turn switch repositioning device for cancellation of the turn signals of automobiles equipped with directional signal lights.

In the past, automobiles equipped with directional signal lights in the front and rear utilized lights at the front and rear on the left side which flash whenever the driver wishes to make a left turn and throws a switch to the "left" position and lights at the front and rear on the right side which flash whenever the driver wishes to make a right turn. The lights continued to flash until the driver either manually returned the switch to the neutral position or until the returning of the driving wheel to a neutral position after making the turn automatically returned the turn switch to the neutral position. In the latter case a ratchet device attached to the steering wheel column usually accomplished the movement of the switch.

Frequently, however, the driver of a car equipped with a manual method of turning off the turn switch failed to do so, with the result that the automobile continued on its way with its signal lights still flashing resulting in considerable confusion and risk of accident to other drivers. Also, even with those cars equipped with automatic cut-off devices responsive to the turning of the steering wheel, the driver frequently travels along his way with his signal lights flashing either as a result of the accidental turning on of the turn switch or because after turning on the switch, the driver changed his mind and decided not to make his turn. Since the steering wheel in the latter case was not turned a sufficient amount, the signal switch was not returned to the neutral position.

Most states permit the use of signal lights in lieu of the use of hand signals to indicate the making of turns. If an oncoming driver relies on the turn signals of the instant car when in fact the driver of that car does not make his signaled turn and an accident thereby results, the driver of the signalling car is responsible for the accident. Every day many accidents occur or nearly occur because some car is driving along with its signal lights flashing unknown to the driver.

It is therefore an object of this invention to provide in a direction signalling system a means for automatically cancelling the signal indication in an automobile under predetermined conditions.

It is another object of this invention to provide in a direction signal system for motor vehicles means for automatically repositioning the turn switch upon the happening of certain predetermined conditions.

It is a further object of this invention to provide an improved turn signal system for motor vehicles which eliminates accidental and misleading signals.

Other objects of this invention will become apparent from the following description taken in conjunction with the accompanying drawings in which.

Figure 1:
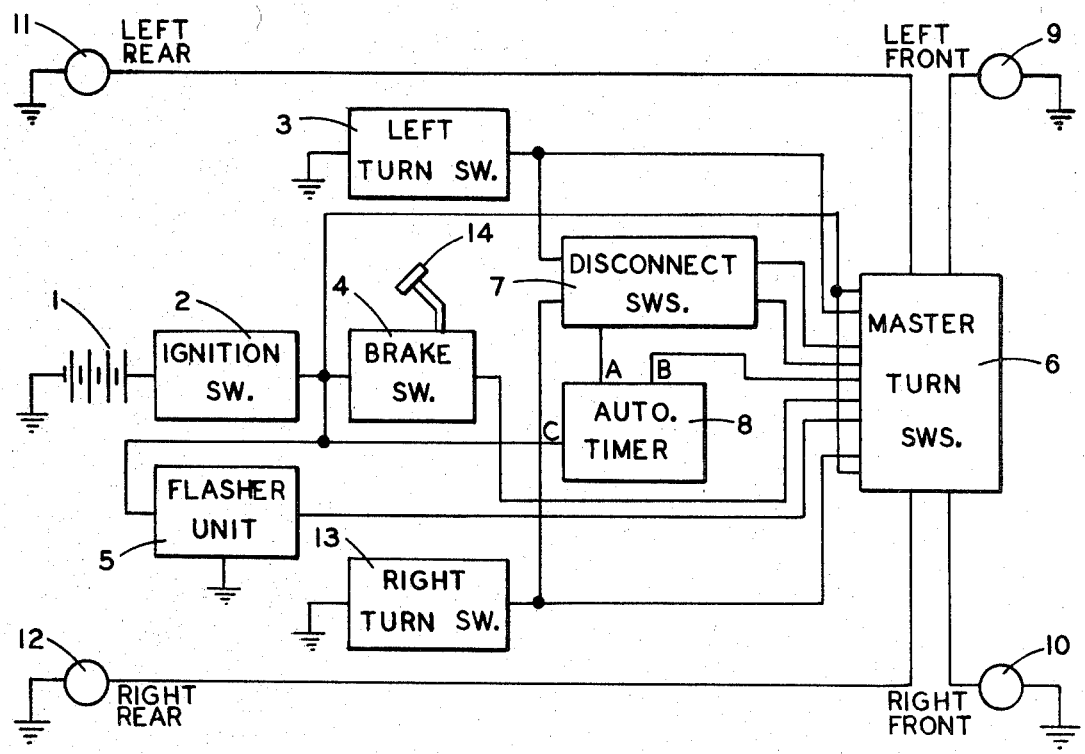
FIG. 1 is a block diagram, partly schematic, of the preferred embodiment of the automobile turn switch repositioning device contemplated by this invention.

Referring now to FIG. 1 a block diagram, partly schematic, of a preferred embodiment of the automatic turn switch repositioning apparatus contemplated by this invention is shown. In this embodiment there is provided source 1 of electrical power, ignition switch 2, left turn switch 3, brake switch 4, flasher unit 5, master turn switch 6, disconnect switch 7, automatic timer unit 8 and right turn switch 13. These switches and units are connected by various wires in a manner to actuate and de-actuate left front signal lamp 9, right front signal lamp 10, left rear signal lamp 11, and right rear signal lamp 12.

Ignition switch 2 is normally open when the vehicle is not operating and is preferably positioned to be closed automatically when the operator turns "on" the ignition. Left turn switch 3 is preferably a press-to-close switch which closes as long as the operator is depressing the switch and automatically opens when the operator releases the switch. Brake switch 4 is normally open and is preferably automatically actuated by the depression of foot brake pedal 14 by the operator. Master turn switch 6 is preferably a four-pole, triple-throw, solenoid operated switch, i.e., a switch having four contact arms insulated from each other and adapted to move in unison between three positions, a neutral position when neither solenoid 15 nor solenoid 16 are energized, and a "left" position when solenoid 15 is energized, and a "right" position when solenoid 16 is energized. Disconnect switch 7 is preferably a two-pole switch with normally closed contacts and which are automatically opened on the happening of certain predetermined events to be described in detail later. Right turn switch 13 is preferably a press-to-close switch which closes as long as the operator is depressing the switch and automatically opens when the operator releases the switch. Each of these switches are positioned in the motor vehicle in a manner to be actuated either manually at the will of the operator or automatically upon a preselected action of the operator or of the happening of a preselected event. Since the preferred operation of the automatic turn signal cancelling circuit of this invention should entail a minimum of manual functions by the operator, as many as possible of the switches should be positioned to be actuated automatically. However, it is readily apparent that all of the above-mentioned switches can be positioned to be manually actuated at the will of the operator.

Figure 2:
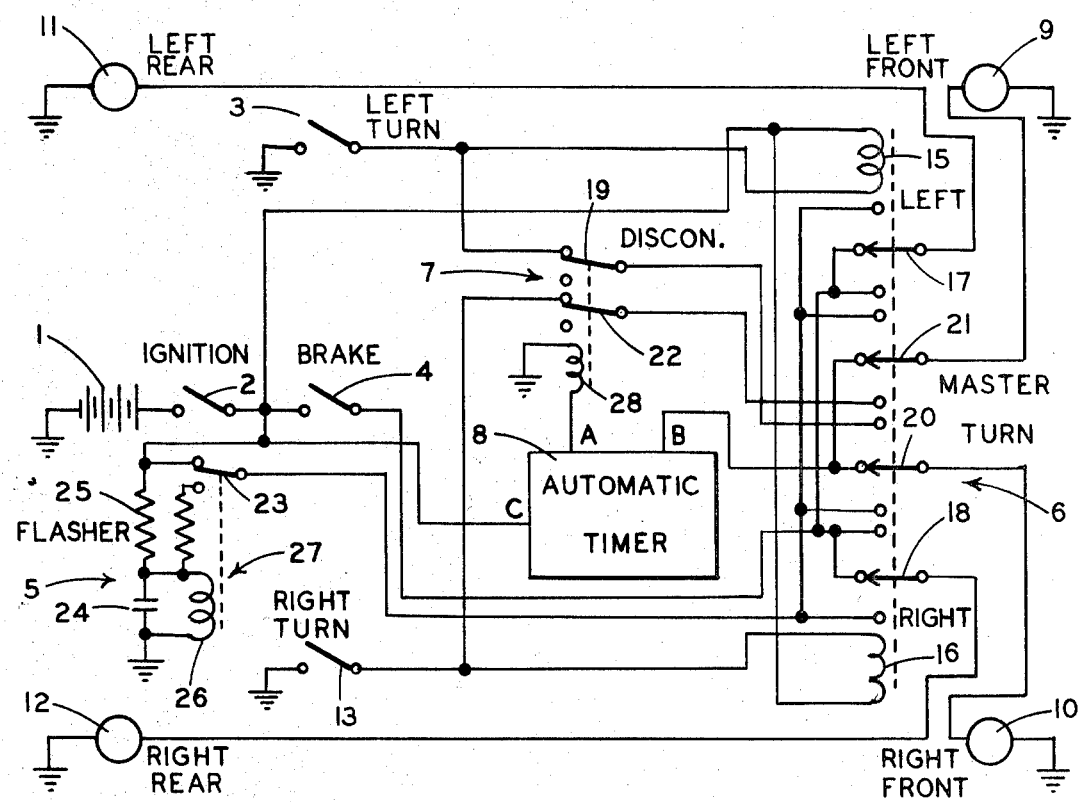
FIG. 2 is a schematic drawing of the automobile turn switch repositioning device shown in FIG. 1 with the automatic timer unit shown in block diagram.

Source 1 is a conventional six or twelve volt storage battery or generator used as a source of current in most of the present day motor vehicles. Flasher unit 5 is provided to furnish intermittent coupling between source 1 and lamps 9, 10, 11 and 12 under certain condititons to be described later. A preferred circuit for flasher unit 5 is shown in FIG. 2 and will be described in detail later. Left front lamp 9 and right front lamp 10 are positioned in the front end of the vehicle and are preferably provided with white lenses. Left rear lamp 11 and right rear lamp 12 are positioned in the rear end of the vehicle and are preferably provided with red lenses.

Referring now to FIG. 2 a schematic drawing, partly in block diagram, of a preferred embodiment of the automatic turn switch repositioning system contemplated by this invention is shown. In this drawing ignition switch 2 is in the "off" position, left turn switch 3 is in the open or unactuated position, brake switch 4 is unactuated, i.e., brake pedal 14 is not being depressed, right turn switch 13 is in the unactuated position, master turn switch 6 is in the neutral position, and disconnect switch 7 is in the neutral or unactuated position. Thus the switches are in the positions normally set for daytime parking. Under these assumed initial conditions, the front and rear lamps are all in the unlighted condition.

The operation of the automatic turn switch repositioning device contemplated by this invention can best be described by illustration with an enumeration of the various possible conditions of operation of the motor vehicle and selecting first one of the conditions required for repositioning the turn signal switch and the resulting code of signals corresponding to each condition. The other alternate conditions for cancellation of the turn signal by repositioning of the turn switch can then be described separately and an indication made as to how they would be substituted into the circuit described.

Referring now to FIG. 1 and more particularly to the schematic drawing of FIG. 2, all of the switches previously described are in the unactuated or neutral position such as would normally occur when the motor vehicle was parked during daylight hours. Under these conditions since ignition switch 2 is open, none of lamps 9 through 12 are lighted. If now ignition switch 2 is turned to the "on" or closed position with the brake and turn switches in the neutral positions shown, none of the lamps will light since the path for current is broken either by brake switch 4 or by master turn switch 6. This is the normal driving condition during daylight hours. If now brake switch 4 is closed by depression of foot brake pedal 14, current flows from source 1 through ignition switch 2 and brake switch 4 and through contacts 17 and 19 of master turn switch 6, to left and right lamps 11 and 12. The rear lamps thereby burn brightly to indicate the braking condition of the automobile. As soon as brake pedal 14 is released switch 4 opens, thereby breaking the circuit.

With the brake switch 4 open and ignition switch 2 closed, if the operator depresses left turn switch 3, left solenoid 15 of master turn switch 6 is energized from source 1 through ignition switch 2 and left turn switch 3. Solenoid 15 pulls all of the contacts of master turn switch 6 to the "left" position and maintains them there as long as solenoid 15 is energized. Solenoid 15 remains energized even after release of left turn switch 3 due to the holding action maintained from source 1 through ignition switch 2, solenoid 15, contact 19 of disconnect switch 7, contact 20 of master turn switch 6 and right front lamp 10. With the master turn switch in the "left" position current flows from source 1 through ignition switch 2, flasher unit 5, and contact 17 to left rear lamp 11 and contact 21 to left front lamp 9. Flasher unit 5 causes a periodically opening and closing of this circuit by means to be described later. Disconnect switch 7 maintains this condition shown in FIG. 2 for a predetermined length of time or until some other condition is satisfied as will be described in more detail later. Ordinarily if the operator makes his left turn at some preselected rate, a ratchet (not shown) or some other means would normally return turn switch 6 to its neutral position at the same time breaking the holding circuit to solenoid 15. If that happens, disconnect switch 7 is never actuated. If, however, the operator fails to make his indicated left turn and also fails to manually return turn switch 6 to the neutral position, disconnect switch 7 is actuated by means to be described later, and solenoid 15 is deenergized by the opening of contact 19 of disconnect switch 7. As a result of the deenergizing of solenoid 15, turn switch 6 returns to the neutral position thereby breaking the connection to lights 9 and 11.

A similar operation is obtained when right turn switch 13 is depressed. In this instance right solenoid 16 is energized from source 1 through ignition switch 2. This causes the contacts of master turn switch 6 to move to the "right" position. Releasing right turn switch 13 does not deenergize solenoid 16 which is still coupled to source 1 through ignition switch 2, and through contact 22, contact 21, and left front lamp 9. Source 1 is connnected through ignition switch 2, flasher 5, and contacts 18 and 20 to right rear lamp 12 and right front lamp 10, respectively. Once again flasher unit 5 provides the intermittent lighting of lamps 10 and 12. If turn switch 6 is returned either manually or automatically to the neutral position within a reasonable length of time, disconnect switch 7 never actuates. If, however, master turn switch 6 is maintained in the "right" position because of the operator's failure to make his indicated right turn or returning switch 6 manually to the neutral position, the actuation of switch 7, by means to be described later, breaks the holding contact 22 for solenoid 16 allowing the contacts of master turn switch 6 to return to the neutral position. This extinguishes lamps 10 and 12.

With master turn switch 6 in the "left" position and left front and rear lamps 9 and 11 flashing intermittently, if brake switch 4 is now closed by the operation of foot brake pedal 14, source 1 is connected through ignition switch 2, brake switch 4, and contact 18 to right rear lamp 12. Thus, lamps 9 and 11 continue to flash while lamp 12 burns brightly to indicate the braking condition of the vehicle. Similarly, with master turn switch 6 in the "right" position and right front and rear lamps 10 and 12 flashing intermittently, if brake switch 4 is closed, source 1 is connected through ignition switch 2, brake switch 4, and contact 17 to left rear lamp 11.

Flasher 5 of FIG. 2 accomplishes the intermittent connect-disconnect function by automatically switching the connections to the lights between a high voltage (the voltage of battery 1) and a comparatively low voltage, whenever the flasher is loaded by a path to ground through contact 23. Thus, when ignition switch 2 is initially closed, capacitor 24 acquires a charge through timing resistor 25. When the charge on capacitor 24 reaches a preselected magnitude, sufficient current flows through relay coil 26 to cause actuation of relay 27 and the switching of contact 23. Contact 23 remains in the switched position until the right terminal of contact 23 is connected to ground through the signal lamps by the actuation of an appropriate switch. Such a grounding connection provides an additional path for the charge on capacitor 24 to bleed off to ground. As the charge on capacitor 24 drops to a preselected value, it is no longer able to supply sufficient current through coil 26 to maintain the relay closed. Contact 23 returns to the unactuated position thereby subjecting the lamps to the full battery voltage and causing them to light. Capacitor 24 again starts to recharge and eventually reactuates relay 27. This series of steps of charging and discharging capacitor 24 continues as long as the lamps are directly connected to contact 23.

For convenience automatic timer 8 of FIG. 2 is shown in block diagram form with leads A, B and C connecting the automatic timer to terminals on the rest of the schematic. FIGS. 3 through 9 represent schematic drawings of various automatic timer units which can be inserted in FIG. 2 in place of timer 8. Each of the automatic timer units of FIGS. 3 through 9 represents a different condition for effecting the repositioning of the master turn switch by the actuation of disconnect switch 7. This repositioning, however, only takes place if the turn switch is not returned in the normal manner.

Referring first to disconnect switch 7, contacts 19 and 22 are normally in the positions shown in FIG. 2. As long as the coil 28 remains unenergized, contacts 19 and 22 remain in such neutral position. As soon as coil 28 is energized from a source to be described later, contacts 19 and 22 open with the results previously described of returning master turn switch 6 to the neutral position by spring action. The actuation of disconnect switch 7 does not occur instantaneously when coil 28 is subjected to a voltage, but only when the magnitude of the applied voltage exceeds some predetermined amount. This may be accomplished by utilizing a conventional pneumatic or hydraulic timing relay or it may be accomplished by utilizing an electronic delay as shown in the drawings. It is sufficient to state that contacts 19 and 22 are opened either a predetermined period of time after coil 28 is first energized or after some other preselected happening.

Figure 3:
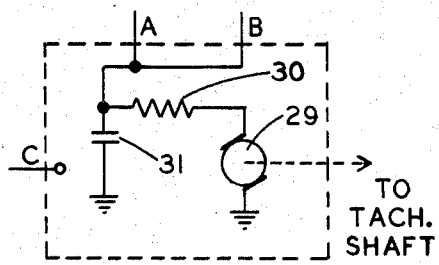
FIG. 3 is a schematic drawing of one embodiment of the automatic timer unit utilized in the turn switch repositioning apparatus shown in FIG. 2.

Referring now to FIGS. 2 and 3, generator 29 is a conventional voltage generator attached to and driven by the tachometer (not shown) of the motor vehicle. When the vehicle is moving forward, generator 29 generates a voltage which is connected through resistor 30 to one side of capacitor 31 to terminals A and B of the automatic timer unit. If master turn switch 6 is in the neutral position, terminal B is connected through contacts 20 and 21 and lamps 10 and 9, respectively, to ground. Only the small resistance of the two lamps connected in parallel is inserted between terminals A and B and ground. Therefore, the voltage across capacitor 31 and across coil 28 which is connected to terminal A is very small. This voltage is too small to cause actuation of coil 28. If, however, master turn switch 6 is moved either to the "left" or the "right" position, the path to ground from terminal B through the lamps is broken. As long as master turn switch is off the neutral position and the motor vehicle is moving forward (otherwise generator 29 would be generating zero voltage), generator 29 is charging capacitor 31 through resistor 30. After a predetermined time delay which is determined by the RC time constant of resistor 30 and capacitor 31 as well as by the magnitude of the voltage being generated by generator 29, capacitor 31 has a charge sufficient to cause coil 28 to actuate switch 7 thereby opening contacts 19 and 22. The opening of contacts 19 and 22 cause master turn switch 6 to return to the neutral position as previously described. It requires another pressing of either left turn switch 3 or right turn switch 13 to again cause master switch 6 to move off the neutral position. Disconnect switch 7 is also immediately reset since terminal B is again connected to ground through the front lamps. This connection quickly discharges capacitor 31 and deenergizes coil 28. It is to be noted that if for any reason, master turn switch 6 is returned to the neutral position before the actuation of coil 28, capacitor 31 is immediately discharged and coil 28 is never subjected to sufficient voltage to cause actuation of switch 7.

Figure 4:
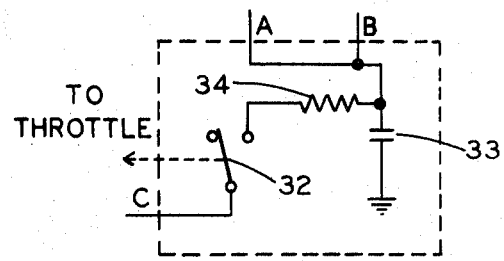
FIG. 4 is a schematic drawing of a second embodiment of the automatic timer unit utilized in the turn switch repositioning apparatus shown in FIG. 2.

Referring now to FIGS. 2 and 4 an alternate timing unit 8 is shown. In this unit, switch 32 is made responsive to the throttle or accelerator pedal (not shown). As long as the accelerator pedal is not depressed, switch 32 is in the open position shown. If however, the accelerator pedal is depressed, switch 32 is placed in the actuated position, thereby connecting capacitor 33 to source 1 through ignition switch 1, switch 32 and resistor 34. However, as long as master turn switch 6 is in the neutral position, the upper side of capacitor 33 is effectively grounded through the front lamps by a connection previously described through terminal B. As soon as switch 6 is placed off the neutral position, capacitor 33 commences to charge from source 1 with a time constant determined by the RC time constant of resistor 34 and capacitor 33. When capacitor 33 has received a charge of a preselected voltage, coil 28 actuates switch 7 with the same results previously described with reference to FIG. 3. A return of master switch 6 to the neutral position, either because of the actuation of switch 7 or for any other reason, causes a quick discharge of capacitor 33 through terminal B and the front lamps.

Figure 5:
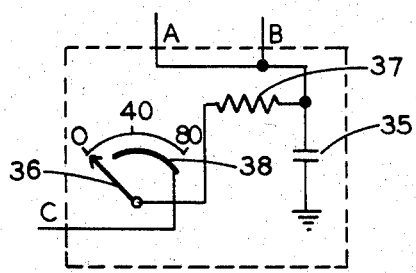
FIG. 5 is a schematic drawing of another embodiment of the automatic timer unit utilized in the turn switch repositioning apparatus shown in FIG. 2.

Referring now to FIGS. 5 and 2 an alternate timing unit 8 is shown. In this unit the circuit between source 1 and capacitor 35 is completed through a contact actuated by the speedometer. Pointer 36 of conductive material is connected through resistor 37 to capacitor 35 and coil 28 connected in parallel, while wiper band 38 is connected through terminal C and ignition switch 2 to source 1. It is noted that as long as the speedometer reads zero, pointer 36 does not make contact with wiper band 38. It is only when the motor vehicle is traveling forward in excess of some preselected speed that the timing action starts. The operation of this embodiment is very similar to those previously described. As long as master turn switch 6 is in the neutral position, capacitor 35 is effectively grounded. It is only when master turn switch is off the neutral position and when the vehicle is moving in excess of some preselected speed, that the timing action or charging of capacitor 35 starts. When capacitor 35 acquires a sufficient charge, coil 28 actuates switch 7. A return of master switch 6 to the neutral position, either because of the actuation of switch 7 or for any other reason, causes a quick discharge of capacitor 35 through terminal B and the front lamps.

Figure 6:
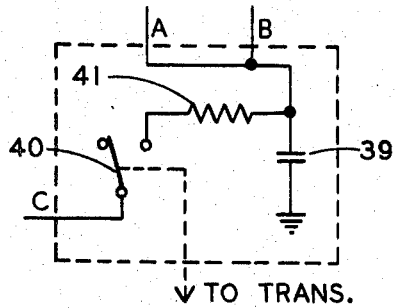
FIG. 6 is a schematic drawing of a further embodiment of the automatic timer unit utilized in the turn switch repositioning apparatus shown in FIG. 2.

Referring now to FIG. 6 an alternative embodiment of the automatic timer used with the apparatus of FIG. 2 is shown. In this embodiment, the circuit between source 1 and capacitor 39 and coil 28 is closed by means of centrifugal switch 40 which is adapted to be actuated only when the transmission shaft (not shown) is turning in excess of some preselected speed. Thus the timing action of this embodiment starts only if the motor vehicle is moving forward above some preselected speed as well as master turn switch being off the neutral position. In this instance capacitor 39 is charged through resistor 41. The operation is the same as that previously described with respect to FIG. 4 except the speed of the vehicle must be in excess of some predetermined value.

In each of the embodiments shown in FIGS. 3, 4, 5 and 6 the timing cycle does not start unless the motor vehicle is traveling in a forward direction above some preselected speed. Then means responsive either to a generator or the tachometer shaft, the accelerator pedal, the speedometer, or the transmission shaft starts the charging of a capacitor and the beginning of the timing period provided turn switch 6 is off the neutral position. In each of the embodiments the actuation of switch 7 by coil 28 results in a resetting of the whole circuit to its starting condition.

Figure 7:
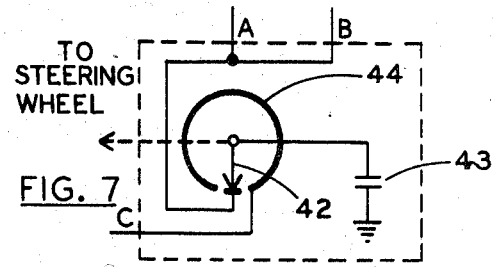
FIG. 7 is a schematic drawing of another embodiment of the automatic timer unit utilized in the turn switch repositioning apparatus shown in FIG. 2.

Referring now to FIG. 7 an alternate embodiment of the automatic timer used with the circuit of FIG. 2 is shown. In this embodiment, the actuation of switch 7 is made responsive to the turning of the steering wheel (not shown). When the steering wheel is positioned to drive straight forward, pointer 42 is in the position shown. Under these conditions capacitor 43 is disconnected from all sources of power and coil 28 is also not subjected to any voltages. If, however, the steering wheel is positioned to turn a preselected amount in either direction, capacitor 43 is connected across source 1 through pointer 42 making contact with wiper contact 44 and through terminal C and ignition switch 2. Capacitor 43 thereupon immediately charges up to full source potential. Nothing further happens until the steering wheel is returned to the neutral position shown. Thereupon capacitor 43 immediately discharges to ground if turn switch 6 is in the neutral position through terminal B or, if turn switch 6 is off the neutral position capacitor 43 discharges into coil 28 causing actuation of switch 7 with the results previously described. Thus in this embodiment the condition required to reset the turn indication is the turning of the steering wheel a predetermined amount and the returning of that steering wheel to the neutral position.

Figure 8:
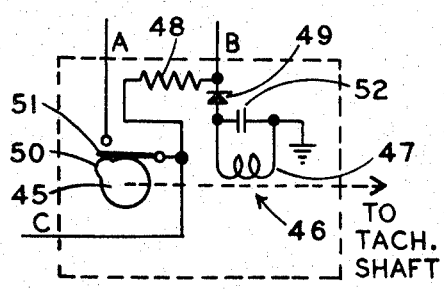
FIGS. 8 and 9 are schematic drawings of further embodiments of the automatic timer unit utilized in the turn switch repositioning apparatus shown in FIG. 2.

Referring now to FIG. 8 another alternate embodiment of the automatic timer used in the circuit of FIG. 2 is shown. In this embodiment cam 45 is coupled through electrical clutch 46 to the tachometer shaft (not shown). When clutch 46 is actuated, cam 45 turns with the tachometer shaft. Coil 47 of clutch 46 is subjected to the full potential of source 1 only when turn switch 6 is off the neutral position. Otherwise terminal B effectively grounds coil 47 through the front lamps. If switch 6 is in either the "left" or the "right" position, coil 47 is energized from source 1 through ignition switch 2, resistor 48 and rectifier 49. Clutch 46 is thereupon actuated, causing cam 45 to rotate in a counter-clockwise direction and continues to rotate as long as turn switch 6 is in the "left" or "right" position. After the motor vehicle moves a predetermined distance, raised portion 50 of cam 45 causes contact 51 to close. The closing of contact 51 connects coil 28 to the full potential from source 1, causing the immediate actuation of disconnect switch 7. Upon the resulting return of master turn switch 6 to the neutral position, coil 47 is not immediately deenergized. The charge which has been accumulated on capacitor 52 cannot discharge through rectifier 49 and therefore must discharge through coil 47. As a result cam 45 is reset to the position shown in FIG. 8.

Figure 9:
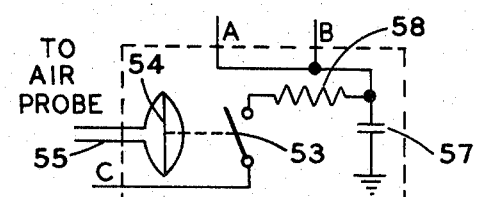

Referring now to FIG. 9 an alternate embodiment of the automatic timer used in the circuit shown in FIG. 2 is shown. In this embodiment switch 53 is actuated whenever the air pressure in tube 55 causes diaphragm 54 to move a predetermined amount. The air pressure in tube 55 is made a function of the speed of the vehicle by utilizing a conventional air probe (not shown) opening forward in the vehicle in the manner similar to the air speed probes currently used in aircraft. The speed with which the vehicle is traveling with reference to the air determines the pressure in tube 55 and therefore the pressure available to move diaphragm 54. Once contact 53 is closed and remained closed, the circuit is similar in operation to that previously described with reference to FIG. 4. As long as master turn switch 6 is in the neutral position very little charge is imposed on capacitor 57. When, however, switch 6 is in the "left" or "right" position, capacitor 57 starts charging through time constant resistor 58. Coil 28 actuates switch 7 whenever the charge on capacitor 57 exceeds a predetermined value.

I claim:
1. A directional signaling system for automotive vehicles having automatic signal cancelling corprising:
    (a) a source of energy capable of supplying a signal;
    (b) means for periodically varying the intensity of said signal;
    (c) indicating means responsive to said signal;
    (d) a first switching means having a first terminal setting, a neutral terminal setting, and a second terminal setting so as to selectively couple said indicating means to said source of energy whenever said first switching means is in said first or second terminal setting;
    (e) actuating means, responsive to said signal for selectively actuating said first switching means so as to couple said indicating means to said signal wherein said first switching means is retained in said actuated state as long as said actuating means remains coupled to said signal;
    (f) a second switching means selectively actuated for coupling said actuating means to said source of energy;
    (g) a third switching means capable of coupling said actuating means to said source through a coupling circuit independent of said second switching means, said independent coupling occurring only after the actuation of said second switching means;
    (h) means for deactuating said third switching means upon the application to said means of a second signal, said second signal being generated from a circuit comprising:
        (1) a generating means capable of generating a second signal, said generating means being driven by the tachometer shaft of said motor vehicle;
        (2) a circuit element having a characteristic resistance;
        (3) a circuit element having a characteristic reactance;
        (4) coupling means for electrically coupling said generating means, said resistance element, said reactance element and said means for deactuating said third switching means such that a delay occurs from the time when said generating means generates said second signal to the time when said signal actuates said means for actuating said third switching means, said delay being attributed in part to the time constant of said circuit.

2. A directional signaling system as described in claim 1 wherein said actuating means are solenoids.

3. A directional signaling system as described in claim 1 wherein said second switching means comprises a set of pushbutton switches, actuated when depressed and automatically deactuated when no longer depressed.

References Cited

UNITED STATES PATENTS

| | | | |
|---|---|---|---|
| 2,845,608 | 7/1958 | Short | 340—56 |
| 3,319,073 | 5/1967 | Wrin | 340—73 |
| 2,085,218 | 6/1937 | Heising | 340—56 |
| 2,308,097 | 1/1943 | Murray, Jr. | 340—56 |
| 2,364,143 | 12/1944 | Horton et al. | 340—56 |
| 3,316,533 | 4/1967 | Kell | 340—56 |
| 3,364,319 | 1/1968 | Elliott | 340—56 |

ALVIN H. WARING, Primary Examiner

H. S. COHEN, Assistant Examiner

U.S. Cl. X.R.

340—73, 81